United States Patent [19]

Conwell

[11] 4,162,118
[45] Jul. 24, 1979

[54] WAVEGUIDE IMAGING SYSTEM
[75] Inventor: Esther M. Conwell, Rochester, N.Y.
[73] Assignee: Xerox Corporation, Stamford, Conn.
[21] Appl. No.: 783,573
[22] Filed: Apr. 1, 1977
[51] Int. Cl.$^2$ .................................. G02B 5/14
[52] U.S. Cl. ..................... 350/96.13; 350/96.29; 350/359
[58] Field of Search .......... 350/96 WG, 96 C, 160 R, 350/160 LC, 96.13, 96.29, 359; 346/107 R

[56] References Cited

U.S. PATENT DOCUMENTS

| | | | |
|---|---|---|---|
| 3,434,776 | 3/1969 | Kern | 350/96 LM |
| 3,455,625 | 7/1969 | Brumley et al. | 350/96 C |
| 3,625,589 | 12/1971 | Snitzer | 350/96.29 |
| 3,838,908 | 10/1974 | Channin | 350/96 WG |
| 3,841,733 | 10/1974 | Ebersole | 350/160 R |
| 3,877,784 | 4/1975 | Lin | 350/96 WG |

Primary Examiner—Conrad J. Clark
Assistant Examiner—Stewart Levy

[57] ABSTRACT

A waveguide system includes a unitary elastomer waveguide means having radiation propagating therethrough. The unitary waveguide means is shaped to have at one end a coupling means and at the other end a plurality of individual waveguide means with field means for selectively attenuating the radiation in selected ones of the individual waveguide means. The system is positioned with respect to an imaging surface so that radiation emanating from the individual waveguide means strikes the imaging surface to form a line pattern of radiated and non-radiated bits.

4 Claims, 4 Drawing Figures

WAVEGUIDE IMAGING SYSTEM

BACKGROUND OF THE INVENTION

The present invention relates generally to a system for making and recording light patterns. More particularly, the present invention pertains to a new and improved integrated optic image recorder.

In the field of image recorders, especially laser image recorders, it has been the general practice to utilize a mechanical scanning system to scan a writing laser over the surface to be marked. Marking on the surface is generally accomplished as a result of the sensitivity of the surface to either the heat or light.

Typically the laser is mechanically scanned across the imaging surface. During the scan, it may be modulated to leave a data path of light-struck and non-light-struck areas in each scan. The imaging surface is indexed between scans so that an image is built up on the surface line-by-line. Modulation is typically controlled by voltage pulses from a computer, or the like.

Although excellent results have been achieved by such systems, they require high precision mechanical and optical equipment capable of operating accurately at high speeds. A system for addressing of an imaging surface which avoids the need for high precision and high speed mechanical scanning equipment is desirable.

A variety of approaches to such a system have already been made. For example, the use of a linear array of light emitting diodes is disclosed by James E. Nucklos et al in U.S. Pat. No. 3,803,631 and by E. B. Neitzel in U.S. Pat. No. 3,438,057. Both systems have certain advantages; however, they are both limited by the intensity of the light available from light emitting diodes. Also, the size of commonly available such diodes can frustrate efforts to achieve high resolution patterns.

An imaging system which enables the use of laser light is disclosed by John F. Ebersole in U.S. Pat. No. 3,841,733. Ebersole discloses the coupling of laser light into a waveguide configuration which comprises a parallel array of lithium niobate or tantalate waveguides which are contacted on one side by a common electrode and on the opposite side by individual electrodes.

The lithium niobate or tantalate waveguides of Ebersole propagate TE waves while TM waves are absorbed by the contacting metal electrodes. When attenuation in a particular one of the parallel waveguides is desired, the individual electrode contacting that waveguide is activated. The field between the common electrode and the individual electrode changes the TE orientation of the propagating wave to TM orientation. The TM wave is then absorbed by the metal electrode.

Ebersole discloses the use of such a system to project a line of information on an imaging surface. Each line comprises bits which correspond to individual ones of the waveguides. The bits are illuminated or not depending on whether a field is present across the individual waveguide. Ebersole discloses the use of a high speed buffer interface between the waveguide electrodes and the serial voltage pulses which control the electrodes. The buffer enables line-by-line parallel addressing of the waveguides responsive to serial input.

The waveguide material of Ebersole, is expensive and easily damaged by radiation. A cheaper waveguide made from a material which is less susceptible to radiation damage is desirable.

In the waveguide system of Ebersole, laser light is first coupled into a glass waveguide where it passes through a diverging lens and a collimating lens. Subsequently, the light is coupled into a parallel row of lithium niobate waveguides where it is modulated.

The glass/lithium niobate interface of Ebersole causes reflection problems. An undesirable amount of light is reflected back into the glass from the interface. A waveguide means for producing a line of modulated bits of light while avoiding lithium niobate/glass interface problems is desirable. A convenient method for making such a waveguide means is also desirable.

SUMMARY OF THE INVENTION

It is an object of this invention to overcome the disadvantages of the prior art.

It is also an object of this invention to furnish a waveguide system for forming a line pattern of bits of information on an imaging surface.

It is a further object of this invention to supply such a system in which the problems of coupling interfaces within the waveguide system are avoided.

It is another object of this invention to furnish a method for making a waveguide means which avoids the problems of coupling interfaces within the waveguide means while enabling line-by-line addressing of an imaging surface with modulated bits of light.

It is yet another object of this invention to avoid the disadvantages of expensive waveguide means which are easily damaged by radiation.

These and other objects are achieved by a novel waveguide system for forming a line pattern of radiated and non-radiated bits on an imaging surface. The system comprises, generally speaking, a unitary waveguide means having propagating therein radiation to which the imaging surface is sensitive and a field means for line-by-line attenuation of the radiation.

The unitary waveguide member is shaped at an entrance end to receive a beam of organized light and to collimate the light across the width thereof. It is shaped at the exit end to form a plurality of separate waveguide means.

The separate waveguide means are arranged substantially parallel to each other and in the same plane. The plane is oriented, with respect to the imaging surface, so that radiation emanating from the waveguide means impinges the imaging surface. The separate waveguide means are selected to attenuate propagating radiation by means of an electrical field.

The field means includes individual electrodes associated with each separate waveguide means so that a field can be formed across the separate waveguide means responsive to electrical signals. In one embodiment, for example, the field means is a common electrode on one side of the waveguide means and individual electrodes on the opposite side.

The attenuation of light propagating through individual ones of the waveguide means produces on the imaging surface a line pattern radiated and non-radiated bits. In a preferred embodiment, the system includes a means for line-by-line indexing the imaging surface with respect to the waveguide means. The indexing is coordinated with sequential line-by-line electrical signal input to the field means.

BRIEF DESCRIPTION OF THE DRAWINGS

The invention will now be described in greater detail with reference to the drawings, in which.

DETAILED DESCRIPTION

Figure 1:
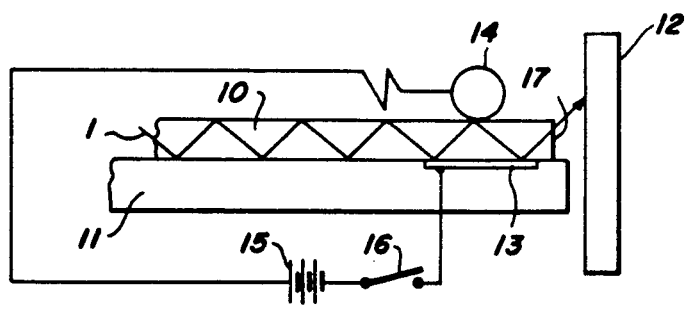
FIG. 1 shows schematically and in cross-section an individual waveguide means in which light is propagating unmodulated.
Figure 2:
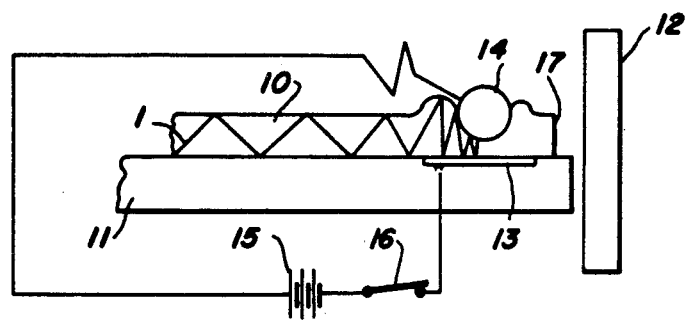
FIG. 2 shows the embodiment of FIG. 1 in which the propagating light is attenuated.

Referring more specifically to FIGS. 1 and 2, there is shown a cross-section of one of the plurality of waveguide means. The arrangement of parts in FIGS. 1 and 2 is for ease in explaining the operation of the system. The relative sizes of the component parts as shown in FIGS. 1 and 2 are also chosen for ease of illustration and is not intended to show commonly encountered size relationships of the parts.

Laser radiation 1 is shown propagating in individual waveguide 2. Waveguide 10 is suitably formed from a physically deformable material coated onto a suitable rigid support substrate 11. The relative thicknesses of waveguide 10 and substrate 11 as shown in FIGS. 1 and 2 are not depicted in actual scale. Waveguide 10 is preferably substantially thinner than the substrate 11, but is shown as being relatively thick for illustration purposes only.

Waveguide 10 is preferably formed of polymer elastomer which has a greater index of refraction than support substrate 11. The elastomer should be one that is capable of being easily deformed when exposed to a force, such as that exerted by an electric field.

A wide variety of elastomers may be selected which meets these requirements. Two such examples include phenylmethyl polysiloxane (n=1.54–1.55 at 6328 Å) and dimethyl polysiloxane (N=1.40–1.41 at 6328 Å) crosslinked to the desired elastomeric state.

Likewise, a wide variety of materials for substrate 11 may be employed. The criteria for selection of such substrate material are that it possesses the requisite mechanical properties, e.g. strength and compatability with the waveguide 10, and that its index of refraction be lower than that of waveguide 10.

By way of example, a Pyrex microscope glass (n=1.513 at 6328 Å) is a suitable substrate where the phenylmethyl polysiloxane waveguide material is used. Lithium fluoride (N=1.39 at 6328 Å) or sodium fluoride (n=1.38 at 6328 Å) may be used with dimethyl polysiloxane waveguides.

Waveguide 10 can be of any suitable thickness. It is observed from experimental data that a preferred thickness is from about 4 to about 10 microns. Such a range of waveguide diameters is readily modulated (as explained below) and produces a relatively high resolution image on imaging surface 12.

The number of individual waveguides at the exit side of the waveguide system can vary greatly depending on the desired resolution. Resolution is generally considered to be satisfactory when 40 micron diameter separate waveguides are spaced at a frequency of at least about 40 per inch, although even fewer waveguides can be used as resolution is not important. Up to about 500 separate waveguides per inch are desirable for high resolution systems.

A first electrode 13 and a second electrode 14 are positioned on either side of waveguide 10. The electrodes are connected through power source 15 so that when switch 16 is closed, a field is created between electrodes 13 and 14. The field draws electrode 14 toward electrode 13 to physically deform elastomeric waveguide 10 and to attenuate the propagating wave as shown in FIG. 2. When switch 16 is open, as shown in FIG. 1, waveguide 10 is not deformed and the radiation propagates unattenuated to impinge imaging surface 12.

Any suitable electrodes 13 and 14 can be used. Good results are observed when electrode 13 is a 300 Å layer of gold which is sputtered or vacuum evaporated onto support substrate 11. Second electrode 14, in this embodiment, is a 10–25 micron diameter tungsten filament placed across 10 micron waveguide 10. Electrodes 13 and 14, in this exemplary embodiment, are connected to a 50–250 V power source 15.

A more detailed discussion of this arrangement for modulating radiation propagating in an elastomeric film-type waveguide can be found in the commonly assigned copending application U.S. Ser. No. 621,312, filed October 10, 1975 now U.S. Pat No. 4,106,848.

Imaging surface 12 can be any suitable photosensitive surface. Any surface which is responsive to the radiation propagating in waveguide 10 is useful. Typically, imaging surface 12 is a uniformly charged photoconductive plate or a photographic plate. In a preferred embodiment, surface 12 is a grounded, conductive aluminum substrate having coated thereon a 60 micron layer of arsenic doped selenium, a well known photoconductor.

In operation, the selenium layer is uniformly charged to a potential of about 1,000 volts. Radiation emanating from the exit end 17 of waveguide 10 and impinging on surface 12, as shown in FIG. 1, will discharge surface 12. There will be little or no discharge of the photoconductive surface in areas corresponding to waveguides in which the propagating light has been attenuated, as shown in FIG. 2. The discharged and non-discharged bits form a pattern on surface 12 which can subsequently be developed by any suitable one of the well known xerographic methods.

It will be apparent that the end 17 of the individual waveguides should be placed sufficiently close to imaging surface 12 so that light 1 impinges surface 12 with usefully high definition and strength. The distance between end 17 and surface 12 is preferably equal to about the width of waveguide 10.

Switch 16 is primarily for illustrative purposes. In a working embodiment, switch 16 is replaced by serial voltage pulses and can be controlled by a high speed buffer to enable parallel addressing.

Figure 3:
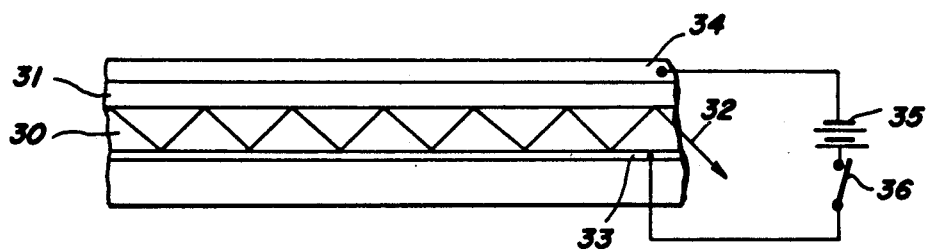
FIG. 3 shows schematically and in cross-section an alternative individual waveguide means suitable for use in the present invention.

Referring more specifically to FIG. 3 there is shown an alternative individual waveguide means and an alternative field means useful in the present invention.

The individual waveguide means in FIG. 3 is sputtered glass member 30 coated with a nematic liquid crystal material 31. Nematic liquid crystal materials are those which exhibit optical uniaxiality. When the orientation of the liquid crystal molecules is parallel with the sputtered glass, radiation 32 propagates in the sputtered glass. When the orientation of the liquid crystal molecules is rotated away from the parallel position, radiation is attenuated.

The field means comprises electrodes 33 and 34 which are connected to power source 35. A field is established across the waveguide by closing switch 36.

The field changes the orientation of the liquid crystals in coating 31 so that sputtered glass member 30 is no longer internally reflective. As in FIGS. 1 and 2, switch 36 is primarily shown for illustrative purposes.

The mechanism used to attenuate radiation propagating in sputtered glass is known in the art and has been described by J. P. Sheridan in his paper entitled "Liquid Crystals in Integrated Optics" given at the Topical meeting on Integrated Optics, New Orleans, January, 1974.

Typical suitable liquid crystal materials for use in forming coating 31 on sputtered glass member 30 are disclosed in U.S. Pat. No. 3,687,515. Other suitable materials include cholesterics; mixtures of cholesterics and smectics; mixtures of nematics and cholesterics, such as about 80 percent by weight methoxybenzylidene-p-n-butylaniline (MBBA) and 20 percent cholesteryl chloride (CC); and mixtures of nematics and optically active non-mesomorphic materials such as 1-menthol; or d-camphor. These materials and mixtures typically exhibit optical characteristics of the cholesteric mesophase and will undergo phase transformation to the optically uniaxial nematic mesophase state in response to suitable stimuli such as, for example, electrical field induced phase transformation as disclosed in U.S. Pat. No. 3,652,148.

An individual waveguide and field means combination such as the one shown in FIG. 3 can be constructed by vacuum coating a gold electrode on a Pyrex microscope slide and placing a Corning 7059 sputtered glass layer over the electrode. The free side of the sputtered glass layer is smeared with a cholesteric liquid crystal. The conductive coating of a NESA transparent electrode is pressed against the liquid crystal. The conductive coating on the NESA electrode and the gold electrode are connected through a suitable power source.

Figure 4:
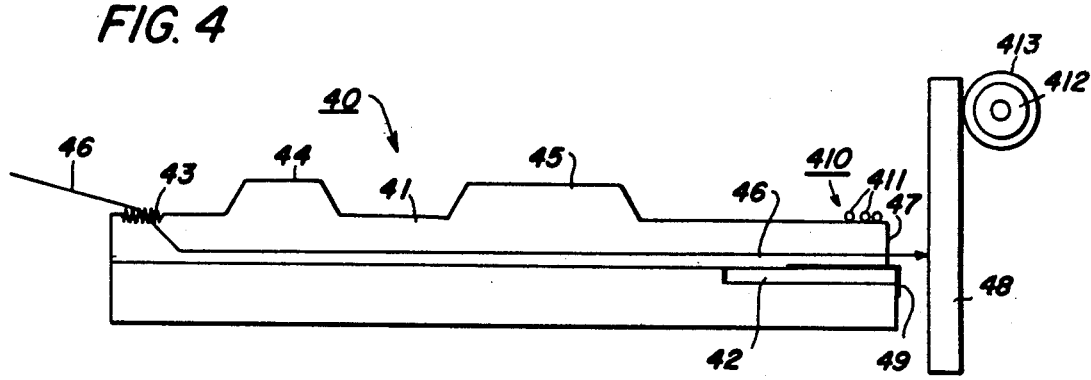
FIG. 4 shows schematically and in cross-section a system for forming a line pattern of radiation on an imaging surface.
Figure 4:
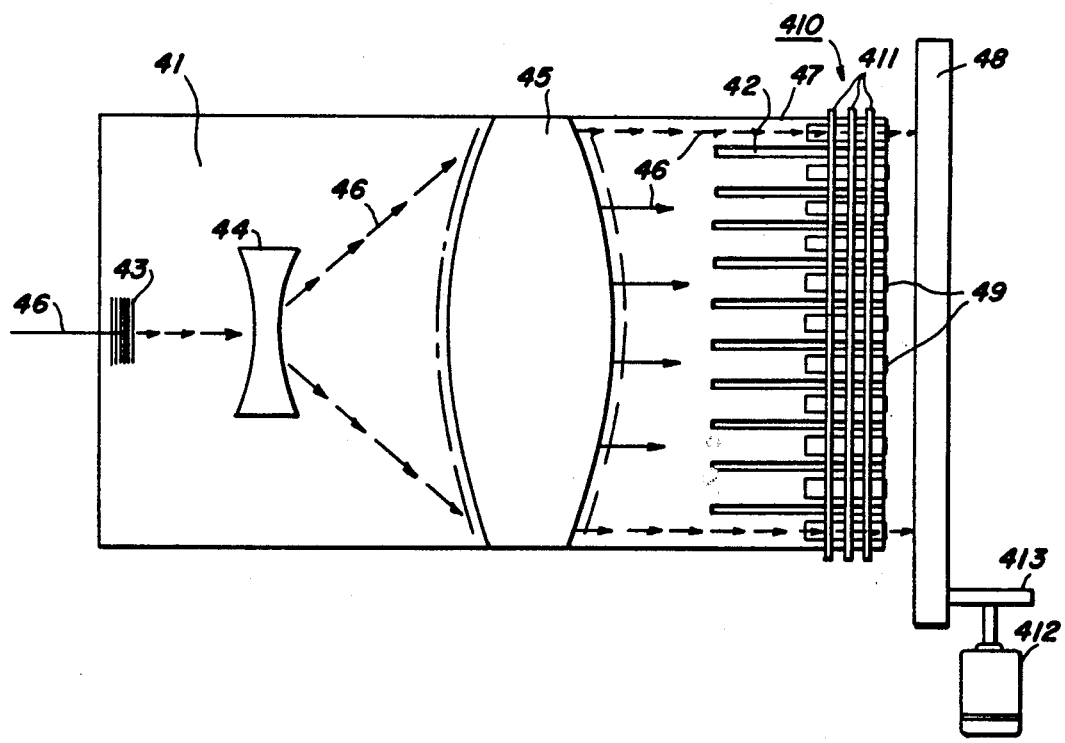

Referring more specifically now to FIG. 4, there is shown in cross-section both a top and side view of the waveguide system making use of the waveguide modulating mechanism described in connection with FIGS. 1 and 2. It is to be understood, however that the modulating system shown in FIG. 3 could also be used. The modulating system of FIGS. 1 and 2 is preferred because of its ease of fabrication, which will be explained in greater detail below.

Waveguide systems 40 of FIG. 4 comprises shaped unitary waveguide means 41 supported on substrate 42. Waveguide means 41 is shaped to have grating 43 for coupling laser light into waveguide means 41.

Waveguide means 41 is also shaped to include aspheric diverging lens 44 and aspheric collimating lens 45. The use of such aspheric lenses in waveguides is well known in the application of waveguides to practical use. See, for example, U.S. Pat. No. 3,841,733 to Ebersole.

The functions of grating 43 and lenses 44 and 45 are to couple laser radiation 46 into waveguide means 41 and to spread it to substantially the width of the waveguide.

Waveguide means 41 is shaped on its exit side to form individual waveguide means 47. Individual means 47 are arranged substantially parallel to each other in the same plane. They are positioned with respect to imaging surface 48 so that light 46 emanating from the ends of individual means 47 impinge surface 48 in substantially a straight line.

Means for attenuating light 46 in individual waveguides 47 includes individual electrodes 49 and common electrode arrangement 410. Arrangement 410 in FIG. 4 is a parallel array of electrode wires 411. Electrodes 49 operate together to attenuate light 46 in individual waveguide means 47 substantially as described in connection with FIG. 1.

There are a variety of electrical control mechanisms well known in the art useful for providing voltage pulses to individual electrodes 49. Typical of such mechanisms are computers including a high speed buffer to convert the serial computer output to parallel (line-by-line) output.

Surface 48 can be indexed synchronously with the line-by-line input. Such indexing can be accomplished by any suitable means, exemplified by stepping motor 412 and friction wheel 413.

The embodiment of FIG. 4 is assembled by first vacuum coating the desired number of electrodes 49 on glass plate 42 at the locations shown in FIG. 4. The electrodes are vacuum coated to a thickness of about 300 Å. The electrodes can be plated to extend onto the end of plate 42 for ease of connection with voltage pulse input connectors (not shown). Vacuum coating is through a mask having openings corresponding to the desired number of individual waveguides 47.

Gold and silver are useful materials for electrodes 49 because of their electrical conductivity, resistance to corrosion and compatability with vacuum deposition techniques.

The electroded substrate 42 is then coated with a layer of ultraviolet (UV) polymerizable liquid. One useful such liquid is polydimethylsiloxane (PDMS). The liquid is cured by exposure to UV radiation through a projection mask. The mask prevents UV radiation from striking the PDMS in the areas between electrodes 49.

The PDMS layer on substrate 42 is UV cured (polymerized) except in the masked areas. The unpolymerized PDMS is washed away with benzene. The polymerized material forms unitary waveguide 41 with individual waveguide meams 47 at the exit end.

The waveguide means 41 is then coated with a second layer of liquid PDMS which is exposed to UV radiation through a second projection mask. The second mask is shaped to enable UV curing of the PDMS so as to form aspheric lenses 44 and 45 and grating 43. Once again the unpolymerized PDMS is removed with a benzene wash.

Tungsten wires are placed across the ends of individual waveguides 47 to form common electrode 411.

In the embodiment of FIG. 4, waveguide system 40 can be made to have any useful number of individual waveguides 47. Typically, such systems have from about 50 to about 500 individual waveguides, depending primarily on the resolution desired in the data line projected on surface 48.

Connectors to electrically couple electrodes 49 with voltage pulse suppliers, such as computers or interfacing high speed buffers, are commonly available in lower frequencies. Higher frequency connectors (such as 500 per inch) are within the capability of large scale integrated circuit technology and are compatible with thin film transistors commonly used in integrated optical circuitry.

It can be seen that waveguide system 40 avoids an undesirable internal interface while enabling the projection on surface 48 of a data line comprising illuminated and non-illuminated bits.

The above description and drawings will be sufficient to enable one skilled in the art to make and use the present invention and to distinguish it from other inventions and from what is old. It will be appreciated that other variations and modifications will occur to those skilled in the art upon reading the present disclosure. These are intended to be within the scope of this invention.

What is claimed is:

1. A waveguide system for forming a line pattern of illuminated and non-illuminated bits on an imaging surface, the system comprising:
   (a) an imaging member having an imaging surface;
   (b) a unitary waveguide means for guiding radiation propagating therein, the unitary waveguide being formed from identical elastomeric material and shaped so as to include a coupling means for coupling light into the waveguide means, lens means for collimating the light and a plurality of individual waveguide means arranged substantially parallel to each other in substantially the same plane, the plane being oriented with respect to the imaging surface so that light emanating from the waveguide system impinges the imaging surface to form a line of bits; and
   (c) field means comprising electrodes positioned on either side of the individual waveguide means so that, when subjected to voltage pulses, the field between the electrodes will attract the electrodes toward each other, altering the dimensional cross-section of the waveguide means between the charged electrodes and attenuating the light propagating therethrough to produce on the imaging surface a line pattern of illuminated and non-illuminated bits.

2. The waveguide system of claim 1 further including a means for line-by-line indexing of the imaging surface with respect to the waveguide means, the indexing being coordinated with voltage pulse input to the field means.

3. A waveguide system for forming a line pattern of illuminated and non-illuminated bits on an imaging surface, the system comprising:
   (a) an imaging member having an imaging surface;
   (b) a unitary waveguide means for guiding radiation propagating therein, the unitary waveguide being formed from identical sputtered glass material and shaped so as to include a coupling means for coupling light into the waveguide means, lens means for collimating the light and a plurality of individual waveguide means arranged substantially parallel to each other in substantially the same plane, the plane being oriented with respect to the imaging surface so that light emanating from the waveguide system impinges the imaging surface to form a line of bits, at least the individual waveguide means having a coating of liquid crystal material; and
   (c) field means comprising electrodes arranged on opposite sides of the individual waveguide means so that, when a field is established between the electrodes the orientation of the liquid crystal molecules is changed and the propagating ability of the waveguide means is altered to produce on the imaging surface a line pattern of illuminated and non-illuminated bits.

4. The waveguide system of claim 3 further including a means for line-by-line indexing of the imaging surface with respect to the waveguide means, the indexing being coordinated with voltage pulse input to the field means.

* * * * *